INVENTOR

DAN LEWIS JR.

BY
ATTORNEYS

United States Patent Office 3,752,873
Patented Aug. 14, 1973

3,752,873
PRINTING PROCESS FOR PLASTIC CONTAINERS
Dan Lewis, Jr., Champaign, Ill., assignor to National Distillers and Chemical Corporation, New York, N.Y.
Continuation-in-part of abandoned application Ser. No. 807,841, Mar. 17, 1969. This application Aug. 5, 1971, Ser. No. 169,454
Int. Cl. B29c 25/00
U.S. Cl. 264—78                                      9 Claims

ABSTRACT OF THE DISCLOSURE

Heat diffusable non-drying inks are printed on plastic containers. The residual surface ink is removed in an oven annealing process which is used to control container volume and dry the bottles.

---

Figure 1:
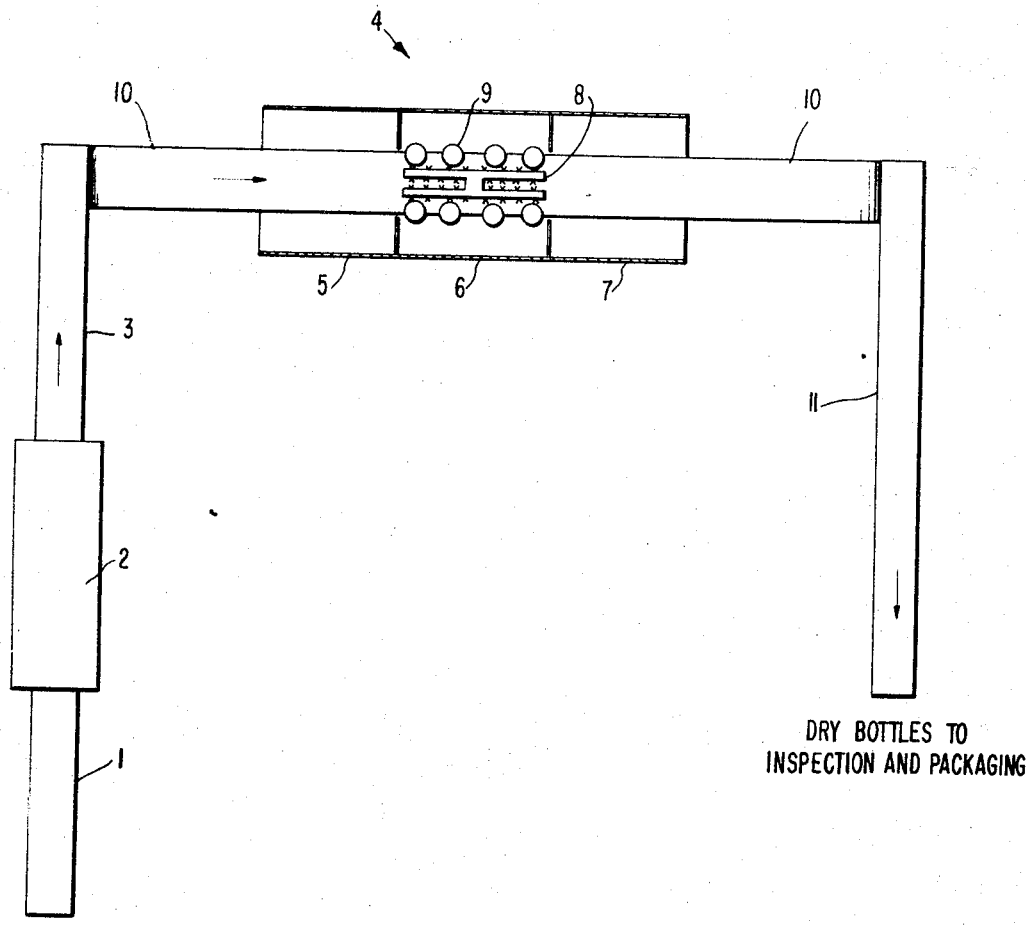

This is a continuation-in-part of application Ser. No. 807,841 filed Mar. 17, 1969, now abandoned.

The invention is directed to a process for removal of residual surface ink from plastic surfaces, more particularly to an oven annealing process in which plastic containers, impregnated with non-drying heat migrating inks, are washed during annealing to remove the non-migrating surface ink components.

The method described below, although having wider application, such as for plastic surfaces generally, was developed particularly for plastic containers, more particularly for plastic reusable milk containers where color identification is required. Special non-drying printing inks have been developed for this purpose. These inks contain organic dyes which migrate on heating into the plastic, the degree of migration being a function of time and temperature.

The non-migrating components in the ink must be removed from the bottle surfaces after the printing step, otherwise the bottles cannot be used without smearing of the residual surface ink. Prior processes have attempted to overcome this smearing problem by wiping residual ink on the surface of the container with a rag, or by water-washing the residual ink by immersion and brush scrubbing in a soap bath. These methods have not proven efficient or economical.

It is necessary, if the use of these heat migrating inks is to be of commercial significance, that a suitable and efficient means be found for the removal of the non-dried residual surface ink.

It is an object of the present invention therefore to provide a means for removing surface dye from plastic containers.

It is a further object of this invention to provide a practical process for utilizing non-drying inks containing heat diffusable dyes for color identification of plastic containers.

We have found that non-migrating components of heat-diffusable inks may be removed from the surface of plastic containers by subjecting said plastic containers to a curing and annealing process in which the plastic is first contacted with ink, then passed to a curing and annealing oven in which the container is heated, the dye diffusing into the plastic wall, then washed, thereby removing the non-migrating components, and finally dried. Simultaneously, during each step, the heated container undergoes annealing to prevent volume shrinkage.

In the drawing:

FIG. 1 is a schematic top view of the apparatus for the annealing, diffusion, and removal steps of this printing process.

Plastic containers or bottles to be color identified are first passed by conveyor 1 to a printing machine 2, in which they are contacted with the non-drying printing inks, said inks containing heat diffusable organic dyes. The printing machine may be of the dry offset, letter press, or silk screen types. The silk screen printing process is preferred as it is most economical for small runs below 60,000 impressions. The ink screens can be custom made easily and economically.

From the printing machine, the bottles (e.g., polyethylene bottles) are transported by conveyors 3 and 10 to a curing and annealing oven 4. The oven contains three distinct zones, the first, an annealing and diffusion zone 5, the second, an annealing and ink removal zone 6, and the third, an annealing and drying zone 7. In all three zones, the containers undergo annealing to prevent volume shrinkage as described in U.S. Pat. 3,317,642, incorporated herein by reference.

In annealing and diffusion zone 5, hereafter referred to as diffusion zone 5, the heated surface dye diffuses into the plastic container wall. The containers are heated to temperatures of 120° F. up to the melting point of the plastic. Heating times range from 0.2 to 120 minutes. For plastic bottles of polyethylene having a density of about 0.960 gm./cm.$^3$, it is preferred to heat to temperatures of 180° F. to 230° F. for from 10 to 30 minutes. These heating and temperautre times are in line with those disclosed in U.S. Pat. 3,317,642 and as such may facilitate printing and washing with existing equipment already in use for bottle volume stabilization.

In annealing and ink removal zone 6, hereafter referred to as wash zone 6, the surface dye on the container wall is removed by subjecting the plastic surface to the action of ink removal sprays 8, such as water. Suitable sprays include hot water heated from 120° F. to 212° F., methyl ethyl ketone and/or ethyl acetate sprays, and solvent sprays consisting of chlorinated organics, ketones, esters, alcohols and other organic solvents known to the art.

Though not intended to be limited hereby, the sprays should have the following characteristics:

(1) The spray orifice diameter should range from 0.010 to 0.200 inches with preferred ranges of 0.020 to 0.060 inches;

(2) The spray pressures should range from 15 to 300 p.s.i. with preferred ranges of 40 to 80 p.s.i.;

(3) The spray distances from the ink bottle's surface should vary from 0.020 to 12 inches with preferred ranges of 0.25 to 2 inches;

(4) The spray temperatures should vary from −50 to 240° F. with preferred ranges of 30 to 80° F.

These spray materials may contain detergents and cleansing compounds. Suitable cleansing compounds include alkyl aryl sulfonates, alkyl aryl polyoxyethylene glycols, sodium or potassium salts of saturated or unsaturated monobasic acids, and sodium or potassium hydroxide solutions in water or alcohol. The detergents can be compounded according to the known prior art formulas. Suitable soaps include Triton X–100, sodium dodecyl benzene sulfonate, sodium dodecyl sulfonate, para dodecyl benzyl polyoxyethylene glycol with 8 to 14 ethoxy units in the glycol chain, sodium stearate, and sodium oleate. The cleansing and soap solutions can be used in concentrations of from 0.05 to 5% by weight but preferably from 0.30 to 2% by weight.

It is desirable but not necessary to use rotating or stationary brushes 9 to aid in ink removal. These brushes may be soaked with any of the materials used for sprays.

The air temperatures in the ink removal zone are maintained at 20° F. up to 10° F. below the melting point of the plastic, temperatures of from 70° F. to 220° F. being preferred. These preferred temperatures are in line with the heating temperatures in the diffusion and drying zones and allow for further annealing of the plastic bottles in the wash zone. Wash zone times may range from 0.02 to 60 minutes, preferably from 0.2 to 5 minutes. While in the wash zone, the bottles are subjected to spraying for from 0.3 to 60 seconds with spraying times of 3 to 10 seconds preferred.

In the diffusion, annealing and drying zone 7, the wet containers are dried and ink further diffused. The annealing process is completed in this zone. The oven times and temperatures in the zone may be the same as those maintained in the diffusion zone. It is preferred to heat the printed plastic bottles at 180° F. to 230° F. at times ranging from 10 to 30 minutes. However, the drying step is optional and can be omitted in some cases since the bottles are in a high temperature zone during washing and since the washing is effected by aerated spray.

The residence time in each zone will be a function of conveyor belt speed and zone length. The speed and length of zone necessary to provide the required heating times can easily be determined by routine calculation.

From the drying zone, the bottles are passed by way of conveyors 10 and 11 to inspection and packaging.

The bottles are conveyed in the curing and annealing oven by endless belt 10 which may be metal, plastic or wood. However, metal belts of the endless steel variety are preferred, as they are the most economical and practical, and already in use in existing annealing ovens.

Although it has specifically disclosed bottles of polyethylene, the invention is no way limited to these polyethylene containers. Examples of containers other than polyethylene milk bottles to which this invention would be applicable are polyethylene drums and tanks.

The process of this invention may also be useful for plastic containers of polypropylene and polypropylene copolymers, polyvinyl chloride, polycarbonate, Teflon, polyacetate butyrate, and other thermoplastics which are formable by the blow molding process.

The inks employed in this process are non-drying, have non-dry carriers, and contain heat diffusible organic dyes.

The dye components of the inks can be any of the well known heat diffusible dyes in colors dictated by the end uses of the containers. Preferred dyes are those containing nitrogen and chlorine. The dyes are generally present in the inks in amounts between about 3 and about 15 percent by weight.

The composition of the washing solution is determined by the type of carrier in a particular ink. Thus, for example, with inks having water-washable carriers such as glycerol, a water wash may be used; with moisture set inks, residual carrier may be removed with a caustic solution (e.g., 3% sodium hydroxide solution); and with solvent based inks, residual carrier may be removed with an organic solution such as an ethyl acetate solution.

Water-washable inks are preferred in terms of both quality and economy and can be be readily used in the conventional silk screen operation.

More specifically, exemplary water-washable inks useful in this process typically include about 10–13% dye, about 55–65% glycerol carrier, about 6–10% water, about 4–10% water insoluble material such as basic magnesium silicate ($Mg_3Si_4O_{10}(OH)_2$) and about 13–20% water soluble material such as a cellulose derivative. All percentages are by total weight of the ink.

The annealing of the printed bottles at 200° F. for 30 minutes gives an ink penetration of 0.005 inch. To test the permanency of the embedded ink after being treated in the manner of this invention, sample bottles were washed for 1000 minutes at 150° F. with 3% sodium hydroxide solutions. The ink penetration increased from 0.005 inch to 0.010 inch in the bottle walls which are from 0.040 inch to 0.080 inch thick. There was no evidence of edge migration by the embedded ink on the bottle wall surface.

In a preferred embodiment, polyethylene bottles are printed on a Dubuit Model 150 silk screen printing machine. The ink used, a red, water-washable ink, contains 10.6% red organic heat-diffusable dyes, 61.0% glycerol, 6.7% water, 6.6% basic magnesium silicate and 13.9% cellulose derivative. The printed bottles are conveyed in line to a drying and annealing oven. The drying and annealing oven has an endless steel link belt which supports and carriers the bottles through the oven at a rate of 1½ inches per minute. The oven is heated by two 150,000 b.t.u. heaters. The bottles are heated for 15 minutes at 200° F. to drive the heat diffusable ink into the walls of the bottles. They are then conveyed into a spray section of the oven where they are forced with a piston and back-up plates into a stationary position for 6 seconds. During this time, city water at 50° F. and 60 pounds pressure per square inch is sprayed through the spray head against the residual surface ink. The spray head is one inch away from the printed surface of the bottle. The spray head orifices are 0.030 inch in diameter and 0.170 inch apart. The residual ink is removed by the spray and the wet, clearly printed bottles are sent through the third section of the oven at 200° F. for an additional 15 minutes. The printed and preshrunken bottles are then packed in line for shipment or inventory.

In a second embodiment, drying zone 7 may be eliminated.

The oven may be heated by any convenient means. Suitable heating means are gas burners, infrared heaters or electrical convection means.

The apparatus described and illustrated for use in carrying out the method disclosed above is solely by way of example. Obviously the containers can be handled in batches rather than on a continuous moving belt. Further, the process is suitable for plastic surfaces of other than containers or bottles.

Having thus described my invention, I claim:

1. A process for printing and volume stabilization of thermoplastic containers comprising:
   (a) applying to the surface of said container a non-drying ink containing organic heat diffusable dyes and non-diffusable ink components; and
   (b) subjecting the inked container to annealing, diffusion and washing by first subjecting the inked container to temperatures in the range of 120° F. up to the melting point of the plastic whereby the dye is caused to diffuse into the wall of said container which undergoes simultaneous annealing and then subjecting the container to spray washing at an air temperature of 20° F. to 10° F. below the melting point of the plastic whereby the non-diffused ink is removed from the container which undergoes simultaneous annealing.

2. A process according to claim 1 in which the washed container is dried by being subjected to an elevated temperature of 120° F. to the melting point of the plastic.

3. The process of claim 2 wherein the time for the diffusion step ranges from 0.2 to 120 minutes, the time for the washing step ranges from 0.02 to 60 minutes, and the time for the drying step ranges from 0.2 to 120 minutes.

4. The process of claim 3 wherein the time ranges for diffusion, washing and drying are 10 to 30 minutes, 0.2 to 5 minutes and 10 to 30 minutes.

5. The process of claim 2 wherein the washing and drying steps are carried out at temperatures of 190° F. to 220° F. and 180° F. to 230° F. respectively.

6. The process of claim 1 wherein the thermoplastic is polyethylene.

7. The process of claim 1 wherein the ink removal spray contains detergent and cleansing compounds.

8. The process of claim 1 wherein the ink removal spray is water.

9. A process for color identification and volume stabilization of polyethylene plastic bottles comprising:
 (a) applying a printing ink containing organic heat diffusable dyes to the surface of the bottles;
 (b) heating the bottles for from 10 to 30 minutes in an annealing and diffusion zone maintained at from 180° F. to 230° F.;
 (c) washing the bottles in an ink removal zone, maintained at from 70° F. to 220° F., the bottles remaining in this zone for 0.2 to 5 minutes, with ink removal sprays, maintained at from 30° F. to 80° F., applied to the bottles for from 3 to 10 seconds.

References Cited
UNITED STATES PATENTS

| | | | |
|---|---|---|---|
| 3,077,040 | 2/1963 | Stieber | 260—78 X |
| 2,980,963 | 4/1961 | Makowski | 264—230 |
| 3,317,642 | 5/1967 | Bailey | 264—230 |
| 3,194,857 | 7/1965 | White | 264—132 X |
| 2,892,733 | 6/1959 | Gardner | 264—22 X |
| 3,121,606 | 2/1964 | Stoy | 264—78 |

ROBERT F. WHITE, Primary Examiner

R. R. KUCIA, Assistant Examiner

U.S. Cl. X.R.

264—132, 233, 235, 346